(12) United States Patent
Nielsen

(10) Patent No.: US 10,131,046 B2
(45) Date of Patent: Nov. 20, 2018

(54) FASTENER AND INSTALLATION DEVICE

(71) Applicant: WINIELSEN PTY LTD, Brisbane (AU)

(72) Inventor: Wade Ian Nielsen, Brisbane (AU)

(73) Assignee: GOLSTONE PTY LTD, Mackay (AU)

( * ) Notice: Subject to any disclaimer, the term of this patent is extended or adjusted under 35 U.S.C. 154(b) by 0 days.

(21) Appl. No.: 15/125,128

(22) PCT Filed: Mar. 12, 2015

(86) PCT No.: PCT/AU2015/050100
§ 371 (c)(1),
(2) Date: Sep. 9, 2016

(87) PCT Pub. No.: WO2015/135038
PCT Pub. Date: Sep. 17, 2015

(65) Prior Publication Data
US 2016/0375569 A1    Dec. 29, 2016

(30) Foreign Application Priority Data
Mar. 12, 2014 (AU) ................ 2014900841

(51) Int. Cl.
*H02G 1/00* (2006.01)
*B25B 31/00* (2006.01)
(Continued)

(52) U.S. Cl.
CPC ............. *B25B 31/00* (2013.01); *B25G 1/04* (2013.01); *B25G 1/08* (2013.01); *E21F 17/02* (2013.01);
(Continued)

(58) Field of Classification Search
CPC ............. H02G 1/00; H02G 1/12; H02G 1/08
(Continued)

(56) References Cited

U.S. PATENT DOCUMENTS 4,286,654 A * 9/1981 Ruhe .................. F22B 1/025
165/172
4,306,697 A * 12/1981 Mathews ............ F16L 3/222
248/68.1
(Continued)

OTHER PUBLICATIONS

International Search Report dated May 14, 2015 for International Patent Application No. PCT/AU2015/050100, 8 pages.
(Continued)

*Primary Examiner* — Lee D Wilson
(74) *Attorney, Agent, or Firm* — Kilpatrick Townsend & Stockton LLP

(57) ABSTRACT

A fastener and a fastener installation device which enables cables to be installed in hard to reach places safely and quickly. The fastener including a body forming a loop; a first connector formed at a first end of the body; and a second connector formed at a second end of the body; wherein the first connector is complementary with the second connector. The first connector of the first fastener connects with a second connector of a second fastener and the second connector of the first fastener connects with a first connector of a third fastener to form a chain of fasteners. The installation device including a hollow body and a cap rotatably mounted to an end of the hollow body which includes an aperture allowing a top fastener to pass through the aperture when the cap is in a first position.

19 Claims, 6 Drawing Sheets

(51) Int. Cl.
*E21F 17/02* (2006.01)
*F16B 2/22* (2006.01)
*F16B 45/02* (2006.01)
*H02G 3/32* (2006.01)
*H02G 1/04* (2006.01)
*F16G 11/10* (2006.01)
*F16G 11/14* (2006.01)
*B25G 1/04* (2006.01)
*B25G 1/08* (2006.01)
*F16B 21/08* (2006.01)

(52) U.S. Cl.
CPC ............... *F16B 2/22* (2013.01); *F16B 45/02* (2013.01); *F16G 11/10* (2013.01); *F16G 11/146* (2013.01); *H02G 1/04* (2013.01); *H02G 3/32* (2013.01); *F16B 21/088* (2013.01)

(58) Field of Classification Search
USPC .......................................................... 29/270
See application file for complete search history.

(56) References Cited

U.S. PATENT DOCUMENTS

| | | | | |
|---|---|---|---|---|
| 4,763,132 A * | 8/1988 | Juds | ............... | H01P 1/00 248/73 |
| 4,813,639 A * | 3/1989 | Midkiff | ............... | F16L 3/227 174/148 |
| 5,638,672 A * | 6/1997 | Furukawa | ............... | F16G 13/16 248/49 |
| 6,354,543 B1 * | 3/2002 | Paske | ............... | H01P 1/00 211/85.18 |
| 7,090,174 B2 * | 8/2006 | Korczak | ............... | F16B 21/075 248/58 |
| 7,097,142 B1 * | 8/2006 | Schmidt | ............... | F16L 3/12 248/68.1 |
| 7,293,745 B2 * | 11/2007 | Catapano | ............... | H02G 3/30 248/61 |
| D628,057 S * | 11/2010 | Benne | ............... | D8/380 |
| 8,353,485 B2 * | 1/2013 | Hjerpe | ............... | F16L 3/222 211/182 |
| 2002/0005463 A1 * | 1/2002 | Paske | ............... | F16L 3/12 248/74.1 |
| 2004/0084574 A1 * | 5/2004 | Goodwin | ............... | F16L 3/1233 248/63 |
| 2006/0233513 A1 * | 10/2006 | Klein | ............... | F16L 3/222 385/147 |
| 2008/0053549 A1 * | 3/2008 | Friedline | ............... | F16L 3/085 138/106 |

OTHER PUBLICATIONS

Written Opinion dated May 14, 2015 for International Patent Application No. PCT/AU2015/050100, 6 pages.

* cited by examiner

SECTION A-A

FASTENER AND INSTALLATION DEVICE

CROSS-REFERENCE TO RELATED APPLICATIONS

This application is a National Stage of International Application No. PCT/AU2015/050100, filed Mar. 12, 2015, which claims priority to Australian Patent Application No. 2014900841, filed Mar. 12, 2014, the disclosures of which are incorporated by reference herein.

FIELD OF THE INVENTION

This invention relates generally to a fastener and an installation device, and in particular to a fastener and installation device for mounting cables in hard to reach locations.

BACKGROUND TO THE INVENTION

In mining environments, cables are often secured to a wire mesh which is mounted to a ceiling of a mine. In order to secure a cable to the mesh, an electrician must climb up a ladder, hold the cable up to the mesh and secure the cable to the mesh using, for example, a cable tie.

Similarly, in order to remove the cable from the mesh, the electrician must go back up the ladder, and cut off the cable tie using a pair of wire cutters.

However using ladders in mining environments adds an element of danger to the process of installing the cables. Ladders are generally considered to present safety risks and, because the ground in mines is often uneven, such risks are often increased as ladders are more likely to topple over. In addition, mining environments are often dimly lit, dusty environments and ladders are less likely to be visible.

There is therefore a need for an improved fastener and installation device.

The reference to any prior art in this specification is not, and should not be taken as, an acknowledgement or any form of suggestion that the prior art forms part of the common general knowledge in Australia or elsewhere.

OBJECT OF THE INVENTION

It is an object, of some embodiments of the present invention, to provide consumers with improvements and advantages over the above described prior art, and/or overcome and alleviate one or more of the above described disadvantages of the prior art, and/or provide a useful commercial choice.

SUMMARY OF THE INVENTION

In one form, although not necessarily the only or broadest form, the invention resides in a first fastener including:
a body forming a loop;
a first connector formed at a first end of the body; and
a second connector formed at a second end of the body;
wherein the first connector connects to a second fastener and is complementary to the second connector that connects to a third fastener.

The first end of the body and the second end of the body may be at opposite ends of the first fastener.

The first connector may be a male connector, and the second connector may be a female connector.

Preferably, the body includes a releasable connector, and is made from a plastic material. Suitably, the releasable connector is formed in the loop.

In one embodiment, the fastener is planar, and a transverse axis of the first fastener is substantially orthogonal to a transverse axis of the second fastener when the first and second connectors are connected together.

In another form, the invention resides in an installation device for installing one or more fasteners, the installation device including:
a hollow body for housing the one or more fasteners; and
a cap rotatably mounted to an end of the hollow body, wherein the cap includes an aperture for allowing a top fastener to pass through the aperture, when the cap is in a first position. Preferably, a next fastener when connected to the top fastener is prevented from passing through the aperture, when the cap is rotated to the first position.

Suitably, the hollow body is cylindrical.

Preferably, the next fastener can pass through the aperture when the cap is rotated to a second position. In one embodiment, the first position is substantially orthogonal to the second position.

Preferably, the installation device includes a spring located inside the hollow body, at an opposite end to the cap, for urging the one or more fasteners towards the cap. A rod may be positioned between the spring and a fastener in order to urge the fasteners towards the cap. An end of the rod may include an aperture for engaging with the first connector of the fastener. A sleeve may be formed in the shaft adjacent the cap. A cross-section of the sleeve may complement a cross section of the rod.

Suitably, the installation device includes a handle at an opposite end to the cap, and the handle may be extendible. The handle may be telescopic or an extension rod may be coaxially connected to the handle.

BRIEF DESCRIPTION OF THE DRAWINGS

An embodiment of the invention will be described with reference to the accompanying drawings in which.

DETAILED DESCRIPTION OF THE PREFERRED EMBODIMENT

Figure 1:
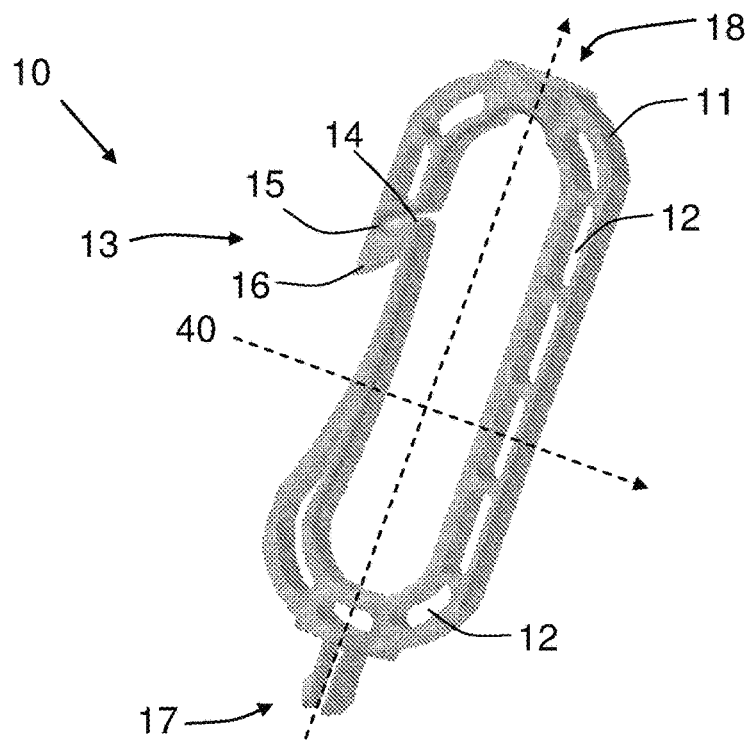
FIG. 1 illustrates a perspective view of a fastener according to an embodiment of the present invention.

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element from another element without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention. It will be appreciated that the invention may be implemented in a variety of ways, and that this description is given by way of example only.

Figure 2:
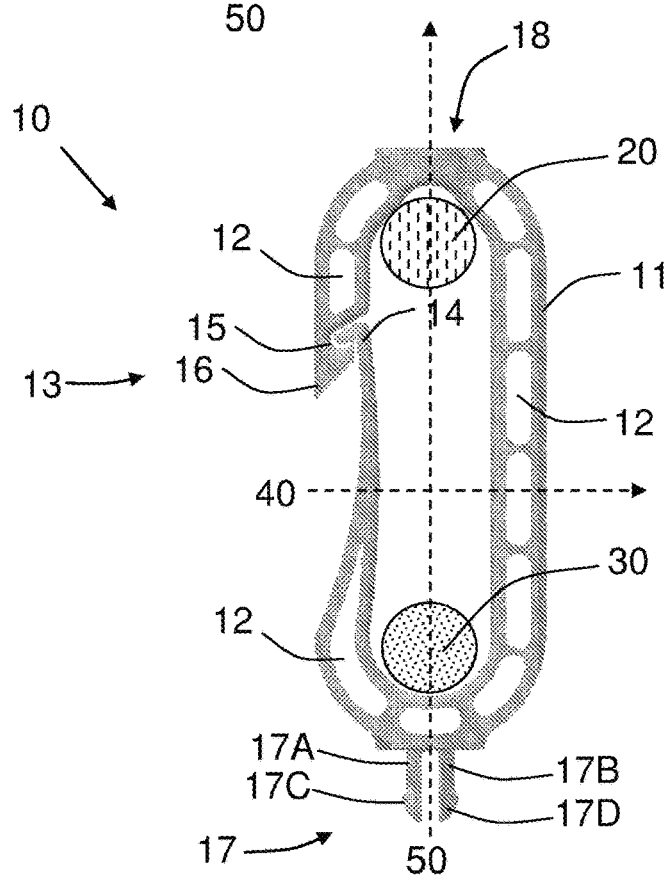
FIG. 2 illustrates a side view of the fastener of FIG. 1.
Figure 3:
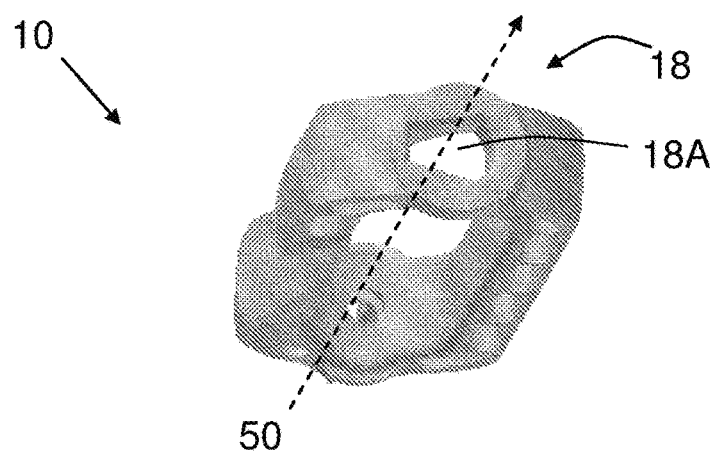
FIG. 3 illustrates a top perspective view of the fastener of FIG. 1.

FIG. 1 illustrates a perspective view of a fastener 10, FIG. 2 illustrates a side view of the fastener 10 of FIG. 1, and FIG. 3 illustrates a top perspective view of the fastener 10 of FIG. 1 according to an embodiment of the present invention. Referring to FIGS. 1-3, the fastener 10 includes a body 11 formed into a loop. In one embodiment, the loop is ovular. However it should be appreciated that the loop may be formed into other shapes such that the loop can hang from a structure 20 such as a wire mesh (shown only in FIG. 2 for clarity) at one end, and to support an article, such as a cable 30 (shown only in FIG. 2), at an opposite end.

The fastener 10 is made from plastic. However it should be appreciated that the fastener may be made from any suitable lightweight and semi-rigid material.

In one embodiment, the body 11 is planar about a transverse axis 40, and may include a plurality of openings 12 formed in the body 11. The openings 12 may reduce an amount of material used to fabricate the fastener 10, and/or to reduce a weight of the fastener 10.

The body 11 also includes a releasable connector 13 formed in the loop. In one embodiment, the releasable connector 13 includes a hook 14, and a clasp 15. The clasp 15 includes a slot formed on an innermost side of the body 11 in order to receive the hook 14. The hook 14 is deformable along the transverse axis 40, and engages with the clasp in a longitudinal axis 50. In addition, the clasp 15 may include a pointed leading edge 16, so that the fastener 10 may latch onto the structure 20. It should be appreciated that any suitable releasable connector 13 may be used to allow the loop to be secured to a structure at one end, and a cable to be positioned inside the loop at an opposite end.

Figure 4:
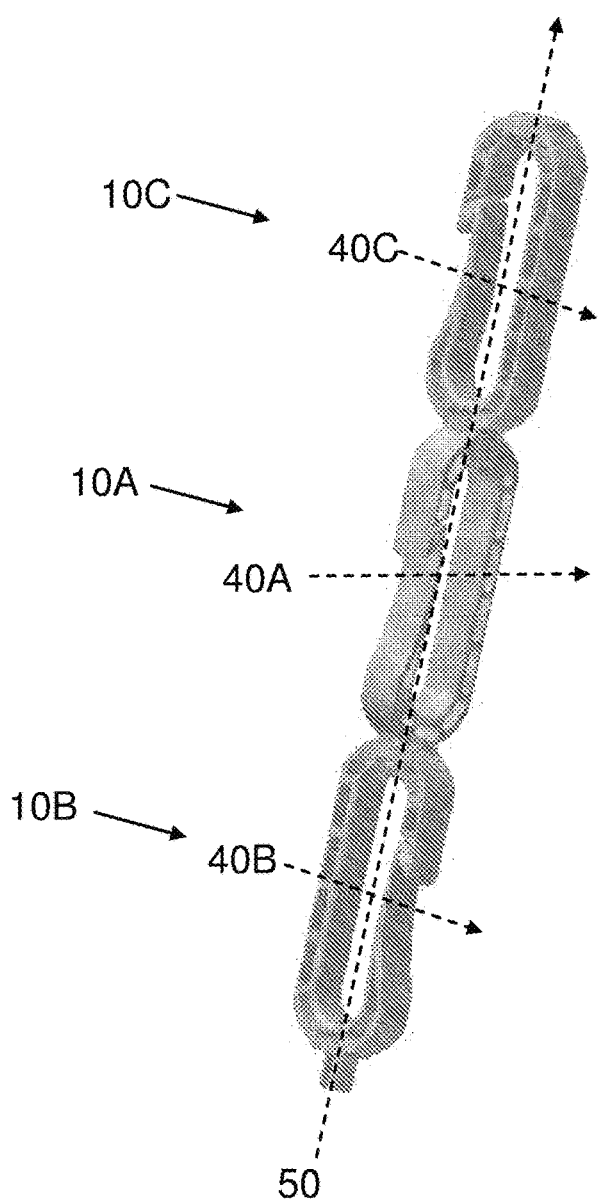
FIG. 4 illustrates a perspective view of a plurality of the fasteners of FIG. 1 connected in a chain.

The body 11 includes a first connector 17 and a second connector 18. The first connector 17 and the second connector 18 are complementary to allow a plurality of fasteners 10 to be connected together in a series as shown in FIG. 4. In one embodiment, the first connector 17 is a male connector, and the second connector 18 is a female connector. However, it should be appreciated that the first connector 17 and the second connector 18 may be designed to "snap off" from each other, or are otherwise easily releasable from each other. For example using hook and loop fasteners.

Referring to FIG. 2, the first connector 17 includes a pair of legs 17A, 17B. The legs 17A, 17B are deformable about the transverse axis 40, to allow the first connector 17 to engage with the second connector 18 of another fastener 10. Furthermore, each leg 17A, 17B includes a tab 17C, 17D for engaging with the second connector 18 of another fastener 10.

Referring to FIG. 3, the second connector 18 includes an aperture 18A. The aperture 18A is a truncated wedge in shape, for receiving a first connector 16 of another fastener.

FIG. 4 illustrates a perspective view of a plurality of fasteners 10A, 10B, 10C connected together in a chain according to an embodiment of the present invention. Although three fasteners 10A, 10B, 10C are shown it should be appreciated that the number of fasteners 10 depends on a number required by a user.

Referring to FIG. 4, in order to connect a first fastener 10A to a second fastener 10B, legs 17A, 17B of a first connector 17 of the first fastener 10A are positioned in the aperture 18A of the second connector 18 of the second fastener 10B, such that a first transverse axis 40A of the first fastener 10A is aligned with a second transverse axis 40B of the second fastener 10B. The first fastener 10A or the second fastener 10B is then rotated through 90 degrees such that the first transverse axis 10A is orthogonal to the second transverse axis 40B, such that the tabs 17C, 17D of the first connector 17 of the first fastener 10A, lock into the wedge shaped aperture 18A of the second connector 18 of the second fastener 10B. Similarly, the first fastener 10A connects to a third fastener 10C, such that the first transverse axis 40A is orthogonal to the third transverse axis 40C. Thus the second transverse axis 40B, and the third transverse axis 40C lie in a same plane. Consequently an end view of the chain of fasteners 10A, 10B, 10C along the longitudinal axis 50, forms a "+" shape.

Figure 5:
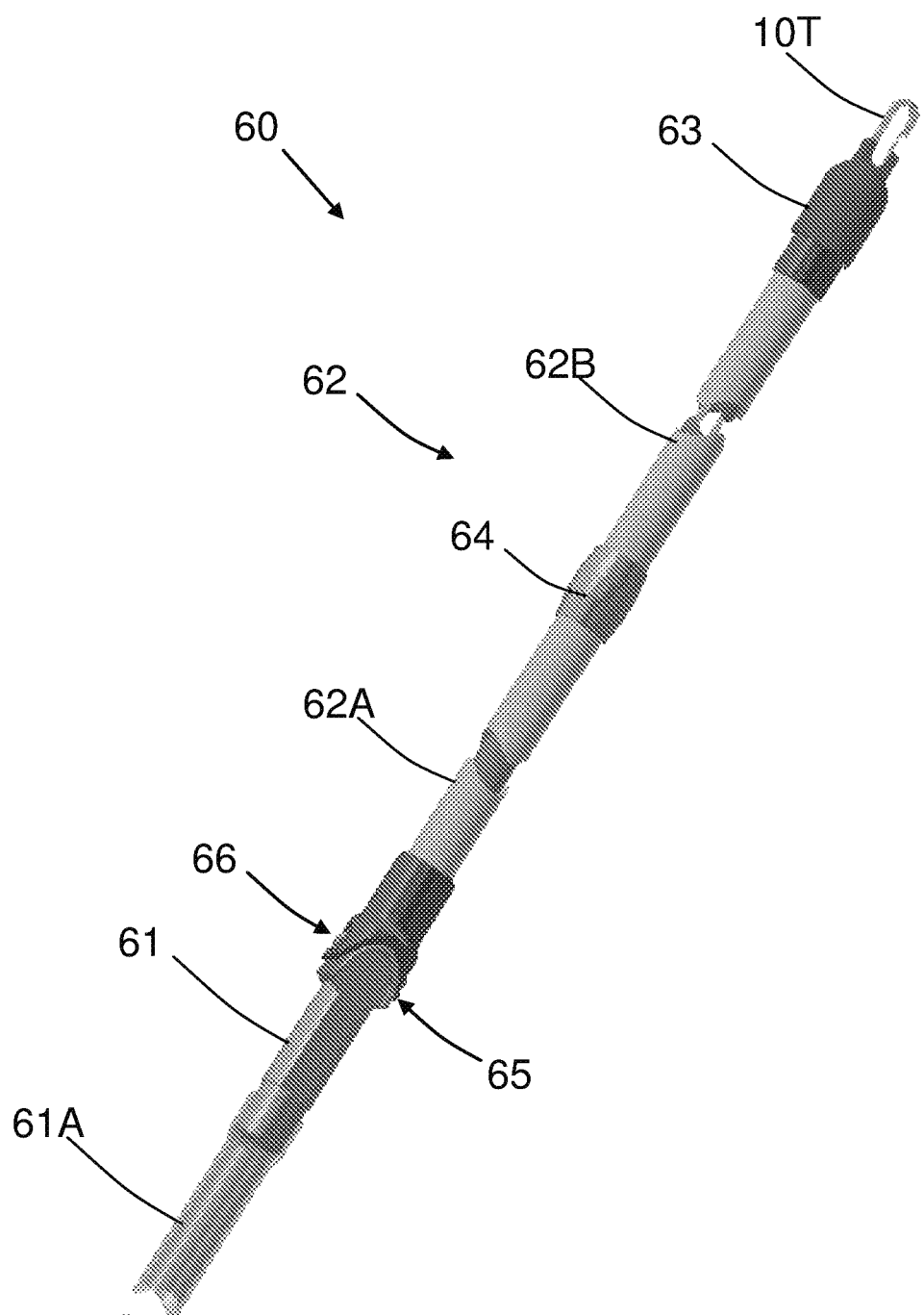
FIG. 5 illustrates a perspective view of an installation device for the fastener of FIGS. 1-4 according to an embodiment of the present invention.
Figure 6:
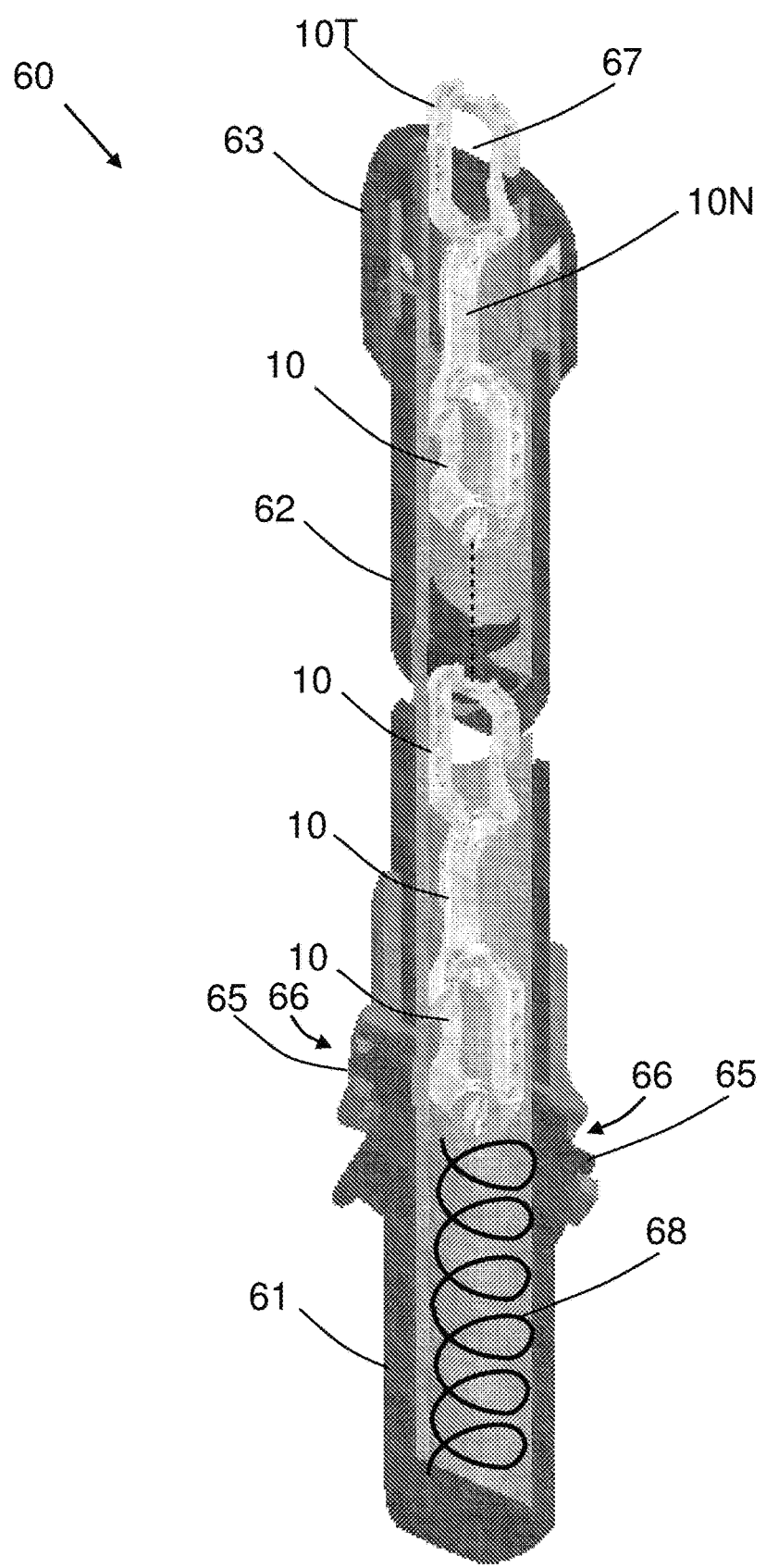
FIG. 6 illustrates a cut-away perspective view of the installation device of FIG. 5.

A plurality of fasteners 10T, 10N, 10, are dispensed using an installation device. FIG. 5 illustrates a perspective view of an installation device 60, and FIG. 6 illustrates a cut-away perspective view of the installation device 60 of FIG. 5 according to an embodiment of the present invention. As shown in FIGS. 5 and 6, the installation device 60 includes a handle 61, a shaft 62, and a cap 63. The installation device 60 may be made of any suitable material such as plastic.

Referring to FIGS. 5 and 6, the handle 61 is hollow in order to house a spring 68. However, it should be appreciated that the spring 68 may be housed in the shaft 62, at an end adjacent the handle 61. In one embodiment, the handle 61 is releasably attached to the shaft 62. The handle 61 may include tabs 65 that snap into corresponding apertures 66 in the shaft 62. In addition the handle 61 may be extended, either telescopically, or by coaxially attaching an extension rod 61A to the handle 61. In one embodiment, the shaft 62 may be extended by connecting a first section 62A of the shaft 62 to a second section 62B of the shaft 62 using a coupling 64.

The shaft 62 is hollow in order to house the fasteners 10T, 10N, 10, and the cap 63 is rotatably mounted to an opposite end of the shaft 62 to the handle 61. The cap includes a slot 67 to complement a transverse axis 40 cross section of a fastener 10, in order to allow a fastener 10 to protrude through the slot 67.

In use, a chain of fasteners 10 is loaded into the installation device 60 by removing the handle 61, and placing the chain into the shaft 62. Alternatively, the cap 63 may be removed and the chain of fasteners 10 loaded into the device through a top of the installation device 60. Once the chain of fasteners 10 has been loaded, the handle 61 or the cap 63 is replaced.

The spring 68 urges the chain of fasteners towards the slot 67 in the cap 63, and a top fastener 10T closest to the cap 63, is pushed through the slot 67 in the cap 63. The cap 63 may be slightly adjusted by rotating the cap 63 in order to line up the top fastener 10T with the slot 67.

In order to dispense a top fastener 10T, a cable 30 is positioned in the loop by bending back the hook 14. The installation device 60 is then held by the handle 61, and the fastener 10 is hooked over the structure 20, for example a wire mesh, by again bending back the hook 14. In order to release the top fastener 10T from a next fastener 10N, the handle 61 is rotated by 90 degrees, so that the top fastener 10T releases from the next fastener 10N. Alternatively, a user may pull the installation device 60, such that the legs 17A, 17B of the top fastener 10T compress allowing the top and next fasteners 10T, 10N to disengage from one another.

In order to install a next fastener 10N, the user rotates the cap 63 by 90 degrees in order to allow the next fastener 10N to protrude through the slot 67. The process continues until more fasteners 10 need to be loaded into the installation device 60.

In addition, the installation device 60 may be used to remove fasteners 10. In order to release a fastener 10 from the structure 20, the slot 67 in the cap 63 of the installation device 60 is inserted into a bottom end of the fastener 10. The handle 61, of the installation device 60, is then twisted until the hook 14 is released from the clasp 15. The fastener 10 is then lifted off the structure 20.

Figure 7:
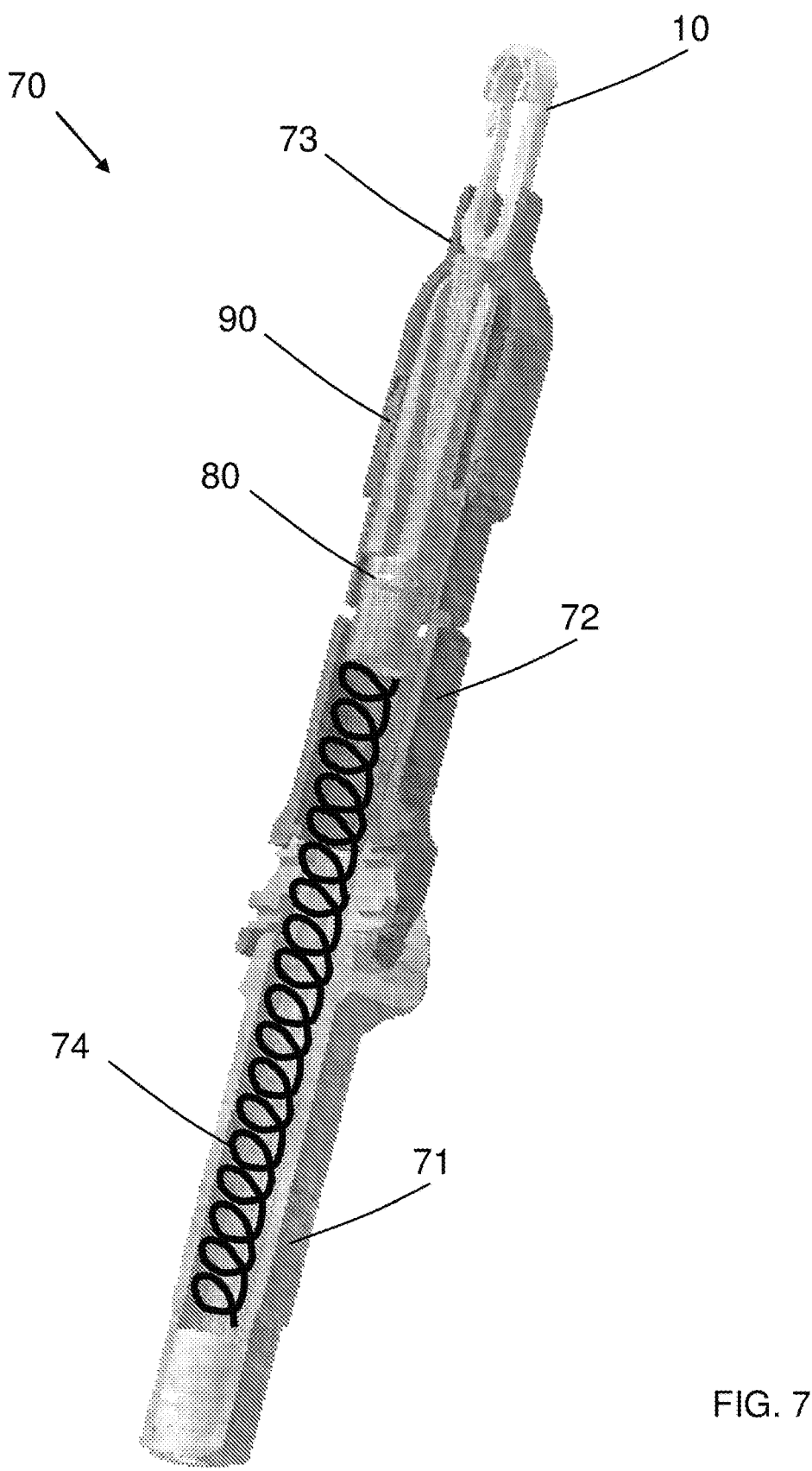
FIG. 7 illustrates a cut-away perspective view of an installation device according to a second embodiment of the present invention.

FIG. 7 illustrates a cut-away perspective view of an installation device 70 according to a second embodiment of the present invention. Similarly to the installation device 60 of FIGS. 5 and 6, the installation device 70 includes a handle 71, a shaft 72, a cap 73, and a spring 74 to urge the fasteners 10 towards the cap 73. However in this embodiment, the installation device 70 includes a rod 80 and a sleeve 90. The rod 80 is positioned between the spring 74 and a last fastener 10, in order to urge the fastener 10 towards the cap 73. The sleeve 90 is formed on an inside end of the shaft 72 adjacent the cap 73. The sleeve 90 may be coaxially mounted to the inside of the shaft 72. Alternatively, the sleeve 90 may be moulded as part of the shaft 72.

Figure 8:
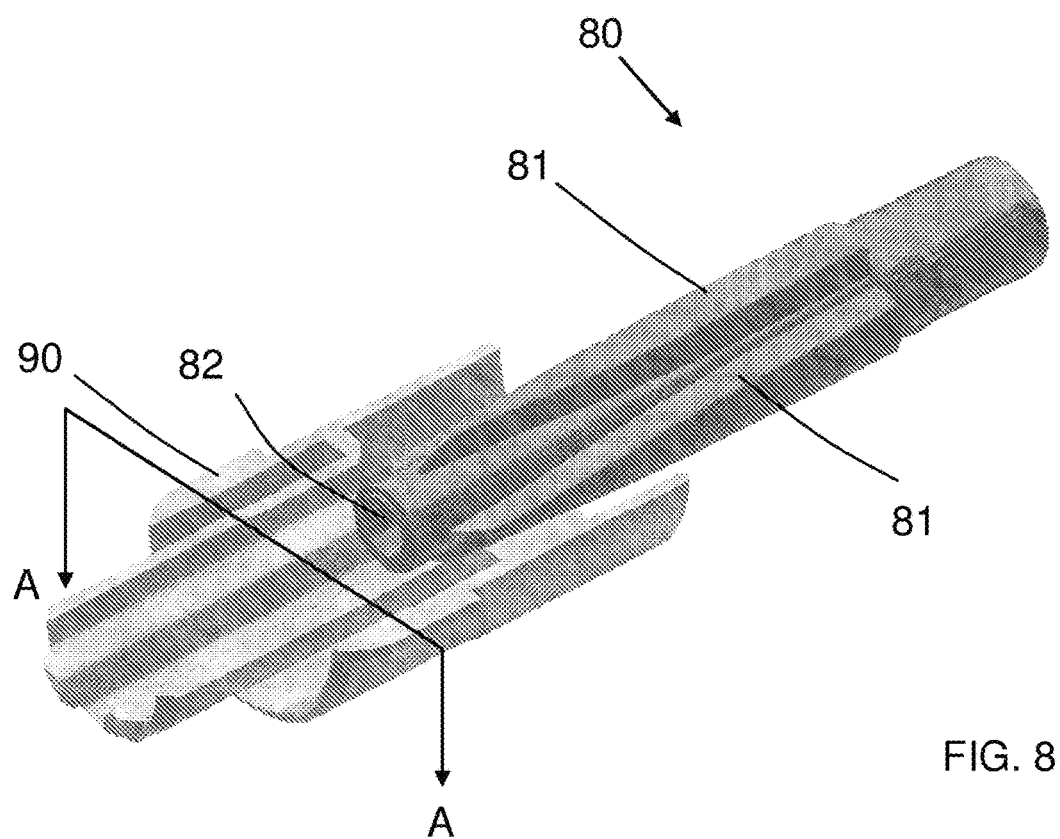
FIG. 8 illustrates a close-up perspective view of a rod and a sleeve of the installation device of FIG. 7.
Figure 9:
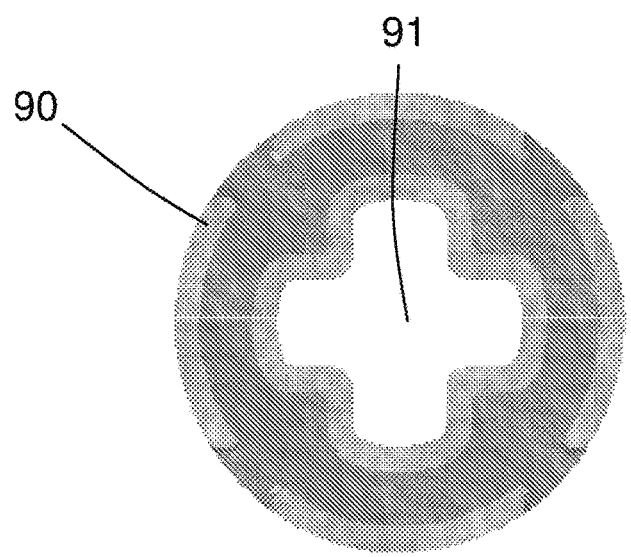
FIG. 9 illustrates a cross-section A-A of the sleeve of FIG. 8 according to an embodiment of the present invention.

FIG. 8 illustrates a close-up perspective view of the rod 80 and the sleeve 90, and FIG. 9 illustrates a cross-section A-A of the sleeve 90 of FIG. 8 according to an embodiment of the present invention. The rod 80 includes a plurality of fins 81, and an aperture 82. The aperture 82 is formed in an end of the rod 80 to receive the first connector 17 of a fastener 10.

The fins 81 complement an aperture 91 formed in the sleeve 90 in order to allow the passage of the rod 80 into the sleeve 90. In one embodiment, a cross-sectional shape of the aperture 91 and the rod 80 is a "+" shape, as shown in FIG. 9. The advantage of this shape is that the sleeve 90 also allows a chain of fasteners 10 to be guided having an end view that is also "+" shaped. However it should be appreciated that any other suitable complementary shapes may be used, such that the rod 80, the aperture 91 and the end view of the chain of fasteners 10 are complementary. It should also be appreciated that the installation device 70 may not include the rod 80.

In summary, the fastener and installation device provides, according to some embodiments, the following advantages:

1) Allows cables to be installed in hard to reach places more safely, and more quickly than prior art systems; and 2) Cables can also be conveniently released from the fastener.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A fastener system comprising:
a fastener configured to be dispensed from an installation device, the fastener comprising:
a body forming a loop and defining an elastic hook and a clasp, whereby application of a force against the elastic hook in a first direction moves the elastic hook towards a center of the loop and away from the clasp;
a first connector formed at a first end of the body; and
a second connector formed at a second end of the body;
wherein the first connector is connectable to a second fastener and is complementary to the second connector that is connectable to a third fastener; and
the installation device comprising:
a hollow body for housing at least one of the first, second, or third fasteners; and
a cap rotatably mounted to an end of the hollow body, wherein the cap includes an aperture configured to allow at least one of the first, second, or third fasteners to pass through the aperture when the cap is in a first position.

2. The fastener system of claim 1, wherein the first end of the body and the second end of the body are at opposite ends of the fastener.

3. The fastener system of claim 1, wherein the first connector is a male connector, and the second connector is a female connector.

4. The fastener system of claim 1, wherein the body is made from a plastic material.

5. The fastener system of claim 1, wherein the loop defines a releasable connector.

6. The fastener system of claim 1, wherein the fastener is planar, and a transverse axis of the fastener is substantially orthogonal to a transverse axis of the second fastener when the first and second connectors are connected together.

7. A fastener system comprising:
a fastener configured to be dispensed from an installation device, the fastener comprising:
a body forming a loop;
a first connector formed at a first end of the body; and
a second connector formed at a second end of the body;
wherein the first connector is connectable to a second fastener and is complementary to the second connector that is connectable to a third fastener; and
the installation device, the installation device comprising:
a hollow body for housing the one or more fasteners; and
a cap rotatably mounted to an end of the hollow body, wherein the cap includes an aperture for allowing a top fastener to pass through the aperture, when the cap is in a first position.

8. The fastener system of claim 7, wherein the hollow body is cylindrical.

9. The fastener system of claim 7, wherein a next fastener can pass through the aperture when the cap is rotated to a second position.

10. The fastener system of claim 9, wherein the first position is substantially orthogonal to the second position.

11. The fastener system of claim 7, wherein the installation device includes a spring located inside the hollow body, at an opposite end to the cap, for urging one or more fasteners towards the cap.

12. The fastener system of claim 11, wherein a rod is positioned between the spring and the fastener in order to urge the fastener towards the cap.

13. The fastener system of claim 11, wherein an end of the rod includes an aperture for engaging with the first connector of the fastener.

14. The fastener system of claim 12, wherein a sleeve is formed in a shaft adjacent the cap.

15. The fastener system of claim 14, wherein a cross-section of the sleeve complements a cross section of the rod.

16. The fastener system of claim 7, further comprising a handle at an opposite end to the cap.

17. The fastener system of claim 16, wherein the handle is extendible.

18. The fastener system of claim 16, wherein an extension rod is coaxially connected to the handle.

19. A fastener configured to be dispensed from a hollow shaft of an installation device, the fastener comprising:
- a body forming a loop and defining an elastic hook and a clasp, whereby application of a force against the elastic hook in a first direction moves the hook toward a center of the loop and away from the clasp;
- a first connector formed at a first end of the body; and
- a second connector formed at a second end of the body;
- whereby the first connector is connectable to a second fastener and is complementary to the second connector that is connectable to a third fastener inside the hollow shaft of the installation device.

* * * * *